US005618510A

United States Patent [19]
Okada et al.

[11] Patent Number: 5,618,510
[45] Date of Patent: Apr. 8, 1997

[54] PROCESS FOR PRODUCING SILICON CARBIDE MATERIAL

[75] Inventors: Kaoru Okada, Kawasaki; Keihachiro Nakajima, Yokohama; Hitoshi Kato, Tokyo, all of Japan

[73] Assignee: New Oji Paper Co., Ltd., Tokyo, Japan

[21] Appl. No.: 419,544

[22] Filed: Apr. 10, 1995

[30] Foreign Application Priority Data

Apr. 12, 1994 [JP] Japan ................................. 6-073425

[51] Int. Cl.$^6$ ................................................. C01B 31/36
[52] U.S. Cl. ..................... 423/346; 423/345; 501/88
[58] Field of Search ............................ 423/345, 346, 423/440, 460; 501/88, 95; 502/178

[56] References Cited

U.S. PATENT DOCUMENTS

| | | | |
|---|---|---|---|
| 3,632,385 | 3/1970 | Schmitt et al. | 117/46 CC |
| 4,342,837 | 8/1982 | Suzuki et al. | 501/90 |
| 4,481,179 | 11/1984 | Wei | 423/346 |
| 4,504,453 | 3/1985 | Tanaka et al. | 423/345 |
| 4,914,070 | 4/1990 | Ledoux et al. | 502/178 |
| 4,915,924 | 4/1990 | Nadkarni et al. | 423/345 |
| 5,221,526 | 6/1993 | Qi et al. | 423/345 |

FOREIGN PATENT DOCUMENTS

| | | |
|---|---|---|
| 603888A2 | 6/1994 | European Pat. Off. . |
| 0603888 | 6/1994 | European Pat. Off. . |
| 2123572 | 11/1972 | Germany . |
| 54-134125 | 10/1979 | Japan . |
| 55-10472 | 1/1980 | Japan . |
| 60-199922 | 10/1985 | Japan . |
| 61-282430 | 12/1986 | Japan . |
| 1-131016 | 5/1989 | Japan . |
| 6-192917 | 7/1994 | Japan . |

*Primary Examiner*—Wayne Langel
*Assistant Examiner*—Amy M. Harding
*Attorney, Agent, or Firm*—Armstrong, Westerman, Hattori, McLeland & Naughton

[57] ABSTRACT

A silicon carbide material in the form of fibers, sheets or three-dimensionally structured articles useful as a reinforcing material and heat-insulating material, is produced by reacting an activated porous carbon material in the form of, for example, fibers, sheets or three-dimensionally structured articles, and having a specific surface area of 100 to 2500 m$^2$/g, with silicon monoxide gas at a temperature of 800° C. to 2000° C. and then heat-treating the resultant silicon carbide material in a non-oxidative gas atmosphere containing nitrogen and substantially no oxygen at a temperature of 800° C. to 2000° C.

7 Claims, No Drawings

PROCESS FOR PRODUCING SILICON CARBIDE MATERIAL

BACKGROUND OF THE INVENTION

1. Field of the Invention

The present invention relates to a process for producing a silicon carbide material. More particularly, the present invention relates to a process for producing a silicon carbide material especially in the form of fibers, sheets or three-dimensionally structured articles, which is useful as a reinforcing material for composite materials and as a heat-insulating material.

2. Description of the Related Art

It is known to produce silicon carbide materials by conversion of a precursor consisting of an organic silicon compound.

In the conventional precursor-converting method, as disclosed in, for example, Japanese Examined Patent Publication (Kokoku) No. 59-33,681, a polydimethyl silane is synthesized from dimethyldichlorosilane in the presence of metallic sodium by a dechlorination reaction, and then converted to a polycarbosilane by a thermal decomposition reaction. The resultant polycarbosilane is melt-spun, the resultant polycarbosilane filaments are heat-treated at a temperature of from 100° C. to 190° C. in air to thermally oxidize the filaments and to make the filaments non-fusible, and then the resultant oxidized filaments are sintered at a temperature of from 1200° C. to 1500° C. in an inert gas stream.

Japanese Unexamined Patent Publication (Kokai) No. 1-131,016 discloses a process for producing silicon carbide which is in the form of a mass consisting of extremely fine particles having a specific surface area of 100 $m^2/g$ or more and useful as a carrier of catalysts for petrochemistry, especially of catalysts which may be heated at a high temperature of about 1000° C. This process comprises a step of reacting a silicon monoxide (SiO) gas with carbon. In this process, in a first reaction region, a mixture of silicon dioxide ($SiO_2$) with silicon (Si) is heated to a temperature of 1100° C. to 1400° C. under a pressure of 0.1 to 1.5 hPa, to produce silicon monoxide (SiO) gas, and then in a second reaction region, the silicon monoxide gas is brought into contact with finely divided reactive carbon having a specific surface area of 200 $m^2/g$ or more at a temperature of 1100° C. to 1400° C. to convert the carbon to silicon carbide. The resultant silicon carbide is usable as a carrier of catalysts for chemical reactions. Therefore, the silicon carbide is required to have a large specific surface area and a high durability of the specific surface area.

Japanese Unexamined Patent Publication (Kokai) No. 60-231,820 discloses a process for coating a surface of a carbon fiber with silicon carbide by heat-reacting a carbon fiber with silicon monoxide (SiO) gas. This process is, however, disadvantageous in that only surface portions of the carbon fibers can be converted to silicon carbide, the inner portions of the carbon fibers substantially cannot be completely converted to silicon carbide, and thus the resultant product exhibits a poor resistance to oxidation at high temperature.

As an attempt to overcome the above-mentioned problems, Japanese Unexamined Patent Publication (Kokai) No. 6-192,917 discloses a process for producing silicon carbide fibers by reacting silicon monoxide gas with activated porous carbon fibers provided with uniform fine pores formed therein and having a size of several angstroms to several hundreds of angstroms, and having a specific surface area of 100 to 2500 $m^2/g$ and a fiber thickness of 5 to 100 μm, at a temperature of 800° to 2000° C. In this process, if the specific surface area is too small, silicon monoxide cannot fully penetrate into the inside of the activated porous carbon fibers, and thus it becomes impossible to produce target fibers completely consisting of silicon carbide. Also, if the specific surface area is too large, the activated porous carbon fibers per se exhibit a poor mechanical strength and thus the yield of the activated porous carbon fibers obtained from a pore-forming process is low. This is a problem of the above-mentioned process.

The activated porous carbon fibers can be produced by various conventional methods, for example, the method of Japanese Examined Patent Publication (Kokoku) No. 61-58,567, in which cellulose fibers, for example, rayon fibers are used as a starting material, the method of Japanese Unexamined Patent Publication (Kokai) No. 61-282,430 in which acrylic fibers are used as a starting material, the method of Japanese Unexamined Patent Publication (Kokai) No. 60-199,922 in which a fibrous material produced from a petroleum pitch is used as a starting material, and the method of Japanese Examined Patent Publication (Kokoku) No. 57-43,647 in which phenolic resin fibers are used as a starting material. In those prior art methods, the carbon fibers produced by dehydrate-carbonizing the starting material fibers in an inert gas atmosphere at a temperature of 200° C. to 400° C., are brought into contact with an oxidative gas, for example, water vapor, oxygen gas or carbon dioxide gas, while heating them at a temperature of 450° C. to 1000° C. higher than the dehydrate-carbonizing temperature, to activate the carbon fibers.

The silicon carbide fibers produced by the above-mentioned methods are disadvantageous in their poor tensile strength. To solve these problems, several attempts have been made by the inventors of the present invention. One attempt is disclosed in Japanese Unexamined Patent Publication (Kokai) No. 7-18,520 a method of heat-treating the silicon carbide fibers produced by the above-mentioned methods in a gas atmosphere containing an oxidative gas at a temperature of 800° C. to 2000° C. Also, in another attempt of the inventors of the present invention, a sheet comprising activated porous carbon fibers having a specific surface area of 100 to 3000 $m^2/g$ is reacted with a silicon monoxide gas at a temperature of 800° to 2000° C. under a reduced pressure and the resultant silicon carbide fiber sheet is heat-treated in a gas atmosphere containing an oxidative gas to enhance the mechanical strength of the silicon carbide fibers.

As mentioned above, when the reaction efficiency of the carbon material with the silicon monoxide gas is enhanced by causing the silicon monoxide gas to fully penetrate into the inside of the activated porous carbon material, it is necessary to make the thickness of the carbon material (fibers) and the size of the fine pores formed in the carbon material as small as possible and to make the specific surface area of the activated porous carbon material as large as possible within a permissible range. However, the resultant porous carbon material exhibits a very poor mechanical strength. Therefore, the fibrous or sheet-shaped silicon carbide material produced from the activated porous carbon material has a very low mechanical strength and is not satisfactory for practical use.

The mechanical (tensile) strength of the silicon carbide material can be enhanced by heat-treating the silicon carbide material in the oxidative gas-containing atmosphere. However, the resultant product has a low modulus of elasticity and thus is unsatisfactory for use as a structural material.

Although the heat-treatment method of the silicon carbide material in an oxidative gas-containing atmosphere effectively increases the materials mechanical strength, it has been confirmed by elemental analysis that a certain portion of the silicon carbide is disadvantageously converted to silicon oxides, for example $SiO_2$, and thus the heat resistance of the silicon carbide material is reduced in response to the production of silicon oxides.

Namely, the prior art processes for producing silicon carbide fibers, sheets or three-dimensionally structural articles are not always satisfactory. Therefore, there is strong demand for a new process for producing a silicon carbide material having an enhanced mechanical strength and modulus of elasticity.

SUMMARY OF THE INVENTION

An object of the present invention is to provide a process for producing a silicon carbide material having an enhanced mechanical strength and modulus of elasticity from an activated porous carbon material.

The above-mentioned object can be attained by the process of the present invention comprising the steps of reacting an activated porous carbon material having a specific surface area of 100 to 2500 $m^2/g$ with a silicon monoxide gas at a temperature of 800° C. to 2000° C., and heat-treating the resultant silicon carbide material in a non-oxidative gas atmosphere containing nitrogen and substantially no oxygen at a temperature of 800° C. to 2000° C.

DESCRIPTION OF THE PREFERRED EMBODIMENTS

In view of the above-mentioned conventional process for producing a silicon carbide material, the inventors of the present invention made an extensive effort to establish a process for producing a silicon carbide material having an enhanced mechanical strength and modulus of elasticity. As a result, the inventors found that the mechanical strength and modulus of elasticity of the silicon carbide material can be significantly enhanced by heat-treating the silicon carbide material in a specific non-oxidative gas atmosphere containing nitrogen and substantially no oxygen. Also, it was found that the heat-treatment of the silicon carbide material in the non-oxidative gas atmosphere effectively decreases the content of oxygen in the silicon carbide material and increases the content of nitrogen in the silicon carbide material so that the surface of the silicon carbide material was covered with nitrogen compounds and became smooth, and the porosity of the silicon carbide material was reduced. Therefore, by the specific process of the present invention, the problems of the prior art processes are solved and the mechanical strength and modulus of elasticity of the silicon carbide material can be significantly enhanced.

Also, the process of the present invention can be applied to the production of the silicon carbide material in the form of fibers, sheets or three-dimensionally structured articles.

In the first step of the process of the present invention, an activated porous carbon material having a specific surface area of 100 to 2500 $m^2/g$, preferably 500 to 1700 $m^2/g$ is reacted with a silicon monoxide gas at a temperature of 800° C. to 2000° C. This reaction of the first step can be carried out by the method disclosed in Japanese Unexamined Patent Publication No. 6-192,917 or 7-18,520.

In the second step of the present invention, the activated porous silicon carbide material, which was never heat-treated in an oxidative gas atmosphere, is heat-treated in a non-oxidative gas atmosphere containing nitrogen and substantially no oxygen at a temperature of 800° C. to 2000° C., preferably 1000° C. to 1800° C.

The activated porous carbon material for the first step is not limited to a specific group of carbon materials, as long as it has a specific surface area of 100 to 2500 $m^2/g$, and may be selected from activated carbon materials produced by conventional carbon-activating methods. When the activated porous carbon material is in the form of fibers or filaments, the porous carbon fibers or filaments are preferably selected from those produced by carbonizing acrylic polymer fibers or filaments or phenolic resin fibers or filaments.

The activated porous carbon material, is reacted with a silicon monoxide gas at a temperature of 800° C. to 2000° C. The supply source of the silicon monoxide gas usable for the present invention is not specifically limited. Preferably, a silicon monoxide gas is generated by heating grains or particles of silicon monoxide or silicon dioxide or a mixture of fine silicon particles and fine silicon monoxide particles or a mixture of fine silicon particles and fine silicon dioxide particles at a temperature of from 500° C. to 2000° C. under a reduced pressure of from $10^{-6}$ to 10 Pa. The gas is introduced into a reaction furnace for the first step of the present invention. Alternatively, the supply source of the silicon monoxide gas consisting of the above-mentioned material is introduced in a predetermined amount together with the activated porous carbon material into the reaction furnace for the first step and they are heated in the reaction furnace at the above-mentioned temperature to produce the silicon monoxide gas and simultaneously react the activated porous carbon material with the silicon monoxide gas.

The generation of the silicon monoxide gas is preferably carried out in a vertical type or horizontal type heating furnace which is provided with an internal heating means, an external heating means or an induction heater, and capable of firing the materials under a reduced pressure or in a gas atmosphere. The heating furnace is preferably a tube type or box type furnace made from a refractory material, for example, alumina, magnesia, zirconia, mullite, carbon or high melting point metals In the method of the present invention, since the silicon monoxide gas penetrates into the fine pores of the activated porous carbon material and reacts with carbon forming the wall surfaces of the fine pores, to convert carbon to silicon carbide, it is preferable that the concentration of the silicon monoxide gas in the reaction system be as high as possible so as to promote the diffusion of the silicon monoxide gas into the fine pores. Preferably the silicon monoxide gas is employed under a pressure of from $10^{-6}$ to 10 Pa. Also, to completely convert carbon located inside of the activated porous carbon material to dense silicon carbide and to prevent generation of whiskers, the pressure of the inside of the reaction furnace is preferably controlled to a level of 10 Pa or less. The temperature of the furnace is adjusted to from 800° C. to 2000° C., preferably 1000° C. to 1800° C.

If the temperature in the reaction furnace is lower than 800° C., the reaction of carbon in the carbon material with silicon monoxide becomes insufficient and the inside portion of the carbon material cannot be completely converted to silicon carbide. If the reaction temperature is higher than 2000° C., the resultant silicon carbide particles grow excessively and thus the resultant silicon carbide material exhibits a reduced mechanical strength and is easily broken.

In the first step of the process of the present invention, the rate of temperature increase is not limited to a specific rate. The reaction system for the first step is, however, heated preferably at a rate of 50° to 1500° C./hr. Also, this reaction temperature is preferably maintained for one minute to 20 hours, more preferably 30 minutes to 10 hours. If the reaction time is shorter than one minute, the reaction may not be complete and thus the inside portions of the carbon fibers are not converted to silicon carbide. If the reaction time is longer than 20 hours, the resultant silicon carbide particles may grow excessively and the resultant silicon carbide fibers exhibit a reduced mechanical strength and thus are easily broken. Also, an excessively long reaction time causes an unnecessary consumption of energy and a reduced economical efficiency.

The activated porous carbon material usable for the process of the present invention includes those in the form of fibers, sheets and three-dimensionally structured articles.

The sheet comprising activated porous carbon fibers may be a woven or knitted fabric consisting of activated porous continuous carbon filament yarns, or a nonwoven fabric or felt formed from activated porous carbon staple fibers by a dry or wet nonwoven fabric-forming method.

The sheet may be produced by forming the activated porous carbon fibers or filaments into a sheet or by forming carbon source fibers or filaments into a sheet, carbonizing and activating the sheet.

The activated porous carbon fiber sheet usable for the process of the present invention can be prepared by the method in which activated porous carbon fibers are formed into a sheet and the activated carbon fiber sheet is converted to a silicon carbide fiber sheet.

Alternatively, as disclosed in Japanese Examined Patent Publication (Kokoku) No. 2-23,505, a porous carbon plate produced by forming a sheet from a mixture of organic fibers usable for producing carbon fibers, with pulp by a paper-forming method, impregnating the sheet with a solution of an organic polymeric material and containing a carbonaceous powder dispersed in the solution, and drying and calcining the impregnated sheet in an inert gas atmosphere at a temperature of 800° C. or more, to carbonize the organic fibers, can be used for the present invention.

The activated porous carbon fiber three-dimensionally structured article includes a honeycomb-shaped article or a corrugated plate made by forming the organic fibers or filaments into a three-dimensionally structured article by cutting and adhering procedures, and carbonizing the organic fiber three-dimensionally structured article.

The resultant activated porous carbon fiber article having the three-dimensional form is converted to a corresponding silicon carbide article by the reaction with the silicon monoxide gas.

In another embodiment, the three-dimensionally structured article is formed from organic fibers and an organic adhesive, and carbonized and activated. The resultant activated carbon fiber article is converted to a corresponding silicon carbide three-dimensionally structured article by the reaction with the silicon monoxide gas.

The form, structure, producing method and sequence of the forming, carbonizing and activating steps for the three-dimensionally structured article consisting of the activated porous carbon fibers is not limited to those mentioned above, as long as at least a portion of the carbon fibers are made porous.

The silicon carbide material produced by the above-mentioned procedures is heat-treated in a heating gas atmosphere containing nitrogen and substantially no oxygen at a temperature of 800° C. to 2000° C., preferably 1000° C. to 1800° C.

If the heat-treatment temperature is lower than 800° C., the reaction of the silicon carbide material with nitrogen is not sufficiently effected, and thus the heat-treatment does not cause the resultant product to exhibit an enhanced mechanical strength and modulus of elasticity. If the heat-treatment temperature is higher than 2000° C., the crystals of silicon carbide grow to an excessively large size and thus the resultant silicon carbide material exhibits a reduced mechanical strength.

The causes of the enhancement of the mechanical strength and modulus of elasticity of the silicon carbide material by the heat-treatment are not completely clear. It is assumed, however, that during the heat-treatment in the nitrogen-containing heating atmosphere substantially free from oxygen, a portion of the silicon carbide compound located in the porous surface of the silicon carbide material reacts with nitrogen and is converted to silicon nitrides, for example, $Si_3N_4$. Also, it is confirmed by a microscopic observation of the surface of the heat-treated silicon carbide material in comparison with that of the corresponding non-heat-treated silicon carbide material, that the heat-treatment reduces the porosity of the silicon carbide material so as to increase the density of the surface portion of the silicon carbide material. The reduction in the porosity and the enhancement in the density cause the heat-treated silicon carbide material to exhibit an enhanced mechanical strength and modulus of elasticity.

Generally, during the reaction of the activated porous carbon material with the silicon monoxide gas in the first step, a very small amount of a by-product comprising oxide compounds, for example, silicon dioxide ($SiO_2$) is inevitably produced and contaminates the resultant silicon carbide material. The contamination of the silicon carbide material with the oxide compound results in a reduction of the mechanical strength and modulus of elasticity of the silicon carbide material. Also, the silicon carbide material produced by the first step of the process of the present invention inevitably contains a small amount of non-reacted carbon.

During the second step of the process of the present invention, the oxide compounds and the non-reacted carbon in the silicon carbide material are reacted with nitrogen and converted to nitrides. This conversion reaction can be confirmed from the contents of oxygen and nitrogen in the heat-treated silicon carbide material and the corresponding non-heat-treated silicon carbide material. Namely, the heat-treatment in the nitrogen-containing heating gas atmosphere substantially free from oxygen increases the content of silicon nitrides and decreases the content of silicon oxides and thus the resultant heat-treated silicon carbide material exhibits an enhanced mechanical strength and modulus of elasticity.

The gas atmosphere containing nitrogen and substantially no oxygen, usable for the heat-treatment consists essentially of 50 to 99.9999% of volume of nitrogen or ammonia and the balance consisting of at least one oxygen-free compound, for example, argon, helium, hydrogen and hydrocarbons. The content of oxygen is restricted preferably to a level of 0.01% by volume or less, more preferably 0.001% by volume or less. As long as the total content of oxygen is not higher than 0.01% by volume, the nitrogen-containing heat-treatment gas atmosphere may contain nitrogen monoxide and nitrogen dioxide.

In the second step of the process of the present invention, the silicon carbide material is placed in a heating furnace, and the nitrogen-containing heat-treatment gas flows through the heating furnace at a temperature of 800° C. to 2000° C. under the ambient atmospheric pressure or higher. Where the nitrogen-containing heat-treatment gas is introduced into the heating furnace under the ambient atmospheric pressure, the gas flow rate is variable in response to the inner volume of the heating furnace. Preferably, the gas flow rate is established so that the total amount of the gas flowing through the heating furnace per one hour is 2 to several hundred times the inside volume of the heating furnace. If the gas flow rate is too low, air may diffuse into the heating furnace so that the oxygen content of the gas atmosphere in the heating furnace increases and the target effect of the heat-treatment is not obtained. Also, an excessive increase in the flow rate of the nitrogen-containing heat-treatment gas does not contribute to enhancing the effect of the heat-treatment and is economically disadvantageous.

The heat-treatment time of the silicon carbide material in the nitrogen-containing heat-treatment gas is variable in response to the heat-treatment temperature, the content of nitrogen in the heat-treatment gas, the flow rate and pressure of the heat-treatment gas. Preferably, the heat-treatment is applied to the silicon carbide material for from one minute to tens of hours, more preferably from one minute to 20 hours after the temperature of the heat-treatment gas reaches a target level.

In the heat-treatment, the silicon carbide material may be placed in the heating furnace without applying a tension. Alternatively, the silicon carbide material may be supported by a specific holder or supporter or loaded under a specific load or tension sufficient to maintain the silicon carbide material in a desired form and dimensions, by using a specific tool, device or weight.

In the heat-treatment, the rate of temperature increase is not limited to a specific rate. Usually, the rate is preferably in the range of from 50° to 1500° C./hr and is as fast as possible unless the heating furnace can be shocked or damaged by the quick expansion thereof. If the temperature-increase rate is too low, a long time may be necessary to reach the desired heat-treatment temperature, the silicon carbide material may be exposed to high temperature for a long time, and the desired effect of the heat-treatment may be not obtained.

In another approach, the temperature of the heat-treatment gas in the heating furnace is raised to a desired level, and then the silicon carbide material is introduced into the heating furnace and maintained in the heating furnace for a desired time.

As explained in detail above, in the process of the present invention, the mechanical strength and modulus of elasticity of the silicon carbide material, which may be in the form of fibers, a sheet or a three-dimensionally structured article, can be significantly enhanced by the second step, namely the heat-treatment, of the process of the present invention, in a specific gas atmosphere containing nitrogen and substantially no oxygen.

EXAMPLES

The present invention will be further explained by way of the following specific examples, which are merely representative and do not in any way restrict the scope of the present invention.

Example 1

A heating container provided with a cap and made from alumina was charged with 2 g of silicon monoxide grains (first class reagent, made by Wako Pure Chemical Industries Ltd.,) and 0.1 g of a bundle consisting of activated carbon fibers produced by activating carbon fibers produced from phenolic resin fibers, having a filament diameter of 10 μm, a specific surface area of 1500 m$^2$/g and a filament length of 100 mm, and available under the trademark of Kynol Activated Carbon Fiber, from Nippon Kynol Inc., was placed on the silicon monoxide grains.

An end of the activated carbon fiber bundle was fixed and another end of the bundle was connected to a fixed spring so as to tense the bundle under a tension of 5 gf. The alumina container containing the activated carbon fiber bundle and the silicon monoxide grains was placed in an alumina core tube in a cylindrical furnace to form a reaction system.

The pressure in the furnace was reduced to 1 Pa, and the temperature of the reaction system was increased at a rate of 430° C./hr to a level of 1300° C. over a time of 3 hours. Then the reaction system temperature was maintained at the level of 1300° C. for 2 hours to generate a silicon monoxide gas and to convert the activated (porous) carbon fibers to silicon carbide fibers in the furnace. Then the resultant reaction product was naturally cooled to room temperature in the furnace. The temperature of this furnace containing the resultant silicon carbide fiber bundle was raised to a level of 1600° C. over a time of 2 hours, maintained at this level for 60 minutes, while maintaining the fiber bundle in the tensed condition and while flowing a nitrogen gas of 99.999% purity by volume at a flow rate of 500 ml/min through the furnace, to heat-treat the silicon carbide fibers. Thereafter, the heat-treated silicon carbide fibers were cooled to room temperature. The resultant silicon carbide fibers were subjected to measurements of tensile strength, modulus of elasticity, oxygen content and nitrogen content thereof.

The silicon carbide fibers had a tensile strength of 1800 MPa, a modulus of elasticity of 200 GPa, an oxygen content of 1.0% by weight and a nitrogen content of 2.0% by weight.

The measurements were carried out in the following manner.

(1) Tensile Strength and Modulus of Elasticity

The tensile strength and modulus of elasticity of the fibers were measured in accordance with Japanese Industrial Standard (JIS), R 7601 by using a tensile tester (trademark: Tensilon, made by Toyo Baldwin Co., Ltd.).

(2) Oxygen Content and Nitrogen Content

The oxygen content and nitrogen content of the fibers were determined by using an oxygen and nitrogen analyzer (trademark: TC-436, made by LECO Co.)

(3) Specific Surface Area

The specific surface area of porous carbon fibers was determined in accordance with a BET multiple point method, by using nitrogen-absorption tester.

Example 2

The same procedures and measurements as in Example 1 were carried out with the following exceptions.

The cylindrical furnace having the alumina core tube was replaced by a metallic gas atmosphere furnace equipped with a tungsten heater.

The heat-treatment in the nitrogen gas flow was carried out at a heat-treatment temperature of 1800° C. with that temperature maintained for 60 minutes.

The resultant silicon carbide fibers had a tensile strength of 1600 MPa, a modulus of elasticity of 200 GPa, an oxygen content of 0.7% by weight, and a nitrogen content of 3.0% by weight.

Example 3

The same procedures and measurements as in Example 1 were carried out with the following exceptions.

The heat-treatment in the nitrogen gas flow was carried out at a heat-treatment temperature of 1000° C. with that temperature maintained for 60 minutes.

The resultant silicon carbide fibers had a tensile strength of 1500 MPa, a modulus of elasticity of 120 GPa, an oxygen content of 2.0% by weight, and a nitrogen content of 1.0% by weight.

Example 4

The same procedures and measurements as in Example 1 were carried out with the following exceptions.

An ammonia gas having a degree of purity of 99.99% by volume was flowed in place of the nitrogen gas at a flow rate of 500 ml/min through the heat-treatment furnace.

The heat-treatment in the ammonia gas flow was carried out at a heat-treatment temperature of 1400° C. with that temperature maintained for 60 minutes.

The resultant silicon carbide fibers had a tensile strength of 1600 MPa, a modulus of elasticity of 200 GPa, an oxygen content of 1.0% by weight, and a nitrogen content of 2.5% by weight.

Comparative Example 1

The same procedures and measurements as in Example 1 were carried out with the following exceptions.

Dried air was flowed in place of the nitrogen gas at a flow rate of 500 ml/min through the heat-treatment furnace.

The heat-treatment in the dried air flow was carried out at a heat-treatment temperature of 1300° C. with that temperature maintained for 15 minutes.

The resultant silicon carbide fibers had a tensile strength of 1600 MPa, a modulus of elasticity of 80 GPa, an oxygen content of 20.0% by weight, and a nitrogen content of 0.1% by weight.

Comparative Example 2

The same procedures and measurements as in Example 1 were carried out with the following exceptions.

The heat-treatment in the nitrogen gas flow was carried out at a heat-treatment temperature of 600° C.

The resultant silicon carbide fibers had a tensile strength of 800 MPa, a modulus of elasticity of 100 GPa, an oxygen content of 5.0% by weight, and a nitrogen content of 0.5% by weight.

Comparative Example 3

The same procedures and measurements as in Example 1 were carried out with the following exceptions.

The cylindrical furnace having the alumina core tube was replaced by a metallic gas atmosphere furnace equipped with a tungsten heater.

The heat-treatment in the nitrogen gas flow was carried out at a heat-treatment temperature of 2100° C.

The resultant silicon carbide fibers could not be subjected to the tensile test due to very easily breakage thereof, and had an oxygen content of 0.5% by weight, and a nitrogen content of 9.0% by weight.

Comparative Example 4

The same procedures and measurements as in Example 1 were carried out except that the heat-treatment was omitted.

The non-heat-treated silicon carbide fibers had a tensile strength of 800 MPa, a modulus of elasticity of 100 GPa, an oxygen content of 5.0% by weight, and a nitrogen content of 0.1% by weight.

Example 5

A fiber mixture was prepared from 55% by weight of polyacrylonitrile fibers having a thickness of 7.8 dtex (7 denier) and a length of 3 mm, 25% by weight of polyacrylonitrile fibers having a thickness of 3.3 dtex (3 denier) and a length of 3 mm and 20% by weight of soft wood bleached kraft pulp fibers having a Canadian Standard Freeness (CSF) of 400 ml, was dispersed in a consistency of 0.8% by dry weight in water, and the resultant slurry was subjected to a paper-forming process by a cylinder paper machine, to produce a single layer mixed fiber sheet having a basis weight of 60 g/m$^2$.

The mixed fiber sheet was heated in air at a temperature of 180° C. for 15 minutes, and then at a temperature of 220° C. for 4 hours, and cooled to room temperature.

Then, the mixed fiber sheet was placed in a heating furnace. The inside temperature of the furnace was raised to 1000° C. over a time of 9 hours and maintained at this level for one hour, while flowing nitrogen gas with a degree of purity of 99.99% by volume at a flow rate of 500 ml/min through the furnace. Thereafter, while flowing the nitrogen gas mixed with 200 ml/min of a carbon dioxide gas through the furnace, the temperature of the furnace was further maintained at 1000° C. for one hour. After cooling, an activated porous carbon fiber sheet having a specific surface area of 1500 m$^2$/g was obtained.

The porous carbon fiber sheet in an amount of 0.5 g was placed together with 10 g of silicon monoxide in an alumina heating container with a cap. The alumina heating container was placed in an alumina core tube in a cylindrical furnace, and the temperature of the furnace was raised to a level of 1300° C. over a time of 3 hours under a reduced pressure of 10 Pa, and maintained at this level for 2 hours. Then, the inside of the furnace was cooled to room temperature. A silicon carbide fiber sheet was obtained.

The sheet was placed in the same heating furnace as mentioned above, and heat-treated at a temperature of 1600° C. for 60 minutes while flowing a nitrogen gas having a degree of purity of 99,999% by volume at a flow rate of 500 ml/min through the furnace. After cooling, a heat-treated silicon carbide fiber sheet was obtained.

This heat-treated silicon carbide fiber sheet had an oxygen content of 1.0% by weight and a nitrogen content of 2.0% by weight.

Example 6

A hexagonal honeycomb article having a side length of 10 mm and an outside length, width and height each of 100 mm was made from the same mixed fiber sheet as in Example 5 and a phenol resin adhesive.

The mixed fiber sheet honeycomb article was carbonized, activated and reacted with the silicon monoxide gas and heat-treated in the pure nitrogen gas in the same manner as in Example 5.

A honeycomb article consisting of heat-treated silicon carbide fibers was obtained. The article had an oxygen content of 1.0% by weight and a nitrogen content of 2.0% by weight.

The test results of the examples and comparative examples are shown in Table 1.

In Comparative Example 3 wherein the heat-treatment in the pure nitrogen gas was carried out at a higher temperature than 2000° C., it was confirmed by microscopic observation that the crystals of silicon carbide grew to an excessively large size so as to cause the structure of the silicon carbide material to be modified. Thus, the resultant product exhib-

TABLE 1

| | | Heat-treatment | | | Heat-treatment product | | | |
|---|---|---|---|---|---|---|---|---|
| Example No. | | Type of gas | Temperature (°C.) | Time (min) | Oxygen content (wt %) | Nitrogen content (wt %) | Tensile strength (MPa) | Modulus of elasticity (GPa) |
| Example | 1 | Nitrogen | 1600 | 60 | 1.0 | 2.0 | 1800 | 200 |
| | 2 | Nitrogen | 1800 | 60 | 0.7 | 3.0 | 1600 | 200 |
| | 3 | Nitrogen | 1000 | 60 | 2.0 | 1.0 | 1500 | 120 |
| | 4 | Ammonia | 1400 | 60 | 1.0 | 2.5 | 1600 | 200 |
| Comparative Example | 1 | Air | 1300 | 15 | 20.0 | 0.1 | 1600 | 80 |
| | 2 | Nitrogen | 600 | 60 | 5.0 | 0.5 | 800 | 100 |
| | 3 | Nitrogen | 2100 | 60 | 0.5 | 9.0 | (*)$_1$ | (*)$_1$ |
| | 4 | — | — | — | 5.0 | 0.1 | 800 | 100 |
| Example | 5 | Nitrogen | 1600 | 60 | 1.0 | 2.0 | — | — |
| | 6 | Nitrogen | 1600 | 60 | 1.0 | 2.0 | — | — |

Note: (*)$_1$ . . . Measurement could not be carried out.

Table 1 clearly shows that the silicon carbide material heat-treated in accordance with the process of the present invention has a low oxygen content and an increased nitrogen content. Namely, in the silicon carbide materials of Examples 1 to 6, the content of oxide compounds, for example, $SiO_2$, which are not contributory to enhance the heat resistance of the silicon carbide material is reduced, and the content of nitride compounds, for example, $Si_3N_4$, which contribute to enhancing the heat resistance, mechanical strength and modulus of elasticity of the silicon carbide material is increased. Therefore, the silicon carbide materials of Examples 1 to 4 exhibited a significantly enhanced modulus of elasticity. Also, the silicon carbide fiber sheet of Example 5 and the silicon carbide fiber honeycomb article had a reduced oxygen content and an increased nitrogen content, and thus exhibited a good hand feeling corresponding to an enhanced modulus of elasticity.

In Comparative Example 1 wherein the heat-treatment of the silicon carbide material was carried out in air at a temperature of 1300° C. for 15 minutes, the resultant product exhibited a higher tensile strength and modulus of elasticity than those of the non-heat-treated silicon carbide material. However, the heat-treatment in air clearly caused the content of oxygen to increase, and thus the resultant product exhibited a lower modulus of elasticity than that of Examples 1 to 4.

In Comparative Example 4 wherein no heat-treatment was applied to the silicon carbide material, the non-heat-treated silicon carbide material exhibited a significantly lower tensile strength and modulus of elasticity than those of Examples 1 to 4.

In Comparative Example 2 wherein the heat-treatment in the pure nitrogen gas is carried out at a temperature lower than 800° C., the resultant product had oxygen and nitrogen contents similar to those of Comparative Example 4 in which the heat-treatment was omitted, and thus a nitriding reaction did not fully occur and the resultant product had an unsatisfactory mechanical strength and modulus of elasticity.

ited a significantly reduced mechanical strength and modulus of elasticity.

In the process of the present invention the heat-treatment in the specific heating gas atmosphere containing nitrogen and substantially no oxygen at a temperature of 800° C. to 2000° C. advantageously reduces the content of oxide compounds in the surface portion of the silicon carbide material, and the content of nitride compounds increases so as to reduce the porosity of the surface portion of the silicon carbide material. Accordingly, the mechanical strength and modulus of elasticity of the silicon carbide material are significantly enhanced. Therefore, the products of the process of the present invention are useful as industrial materials, especially as reinforcing fiber materials for composite materials having a complicated form and as heat-insulating materials.

We claim:

1. A process for producing a silicon carbide material comprising the steps of:

reacting a carbon material consisting essentially of activated porous carbon fibers, said fibers having a specific surface area of 100 to 2500 m$^2$/g, with a silicon monoxide gas at a temperature of 800° C. to 2000° C., and heat-treating the resultant porous silicon carbide material in a non-oxidative gas atmosphere consisting essentially of nitrogen or ammonia and substantially no oxygen at a temperature of 800° C. to 2000° C.

2. The process as claimed in claim 1, wherein the non-oxidative gas atmosphere for the heat-treatment step consists essentially of 50.0% by volume or more of at least one member selected from the group consisting of nitrogen, and ammonia and 50.0% by volume or less of at least one inert gas selected from the group consisting of argon, helium, hydrogen and gaseous hydrocarbons.

3. The process as claimed in claim 1, wherein in the heat-treatment step, the temperature of the non-oxidative gas atmosphere is raised at a rate of 50° to 1500° C./hr and maintained at the level of 800° C. to 2000° C. for one minute to 20 hours.

4. The process as claimed in claim 1, wherein the activated porous carbon fibers have a thickness of 5 to 100 μm.

5. The process as claimed in claim 1, wherein the carbon material is in the form of a sheet and the activated porous carbon fibers have a thickness of 5 to 100 μm.

6. The process as claimed in claim 1, wherein the carbon material is in the form of a three-dimensionally structured article.

7. The process as claimed in claim 6, wherein the three-dimensional structured article is a honeycomb structural article or a corrugated plate.

* * * * *